UNITED STATES PATENT OFFICE.

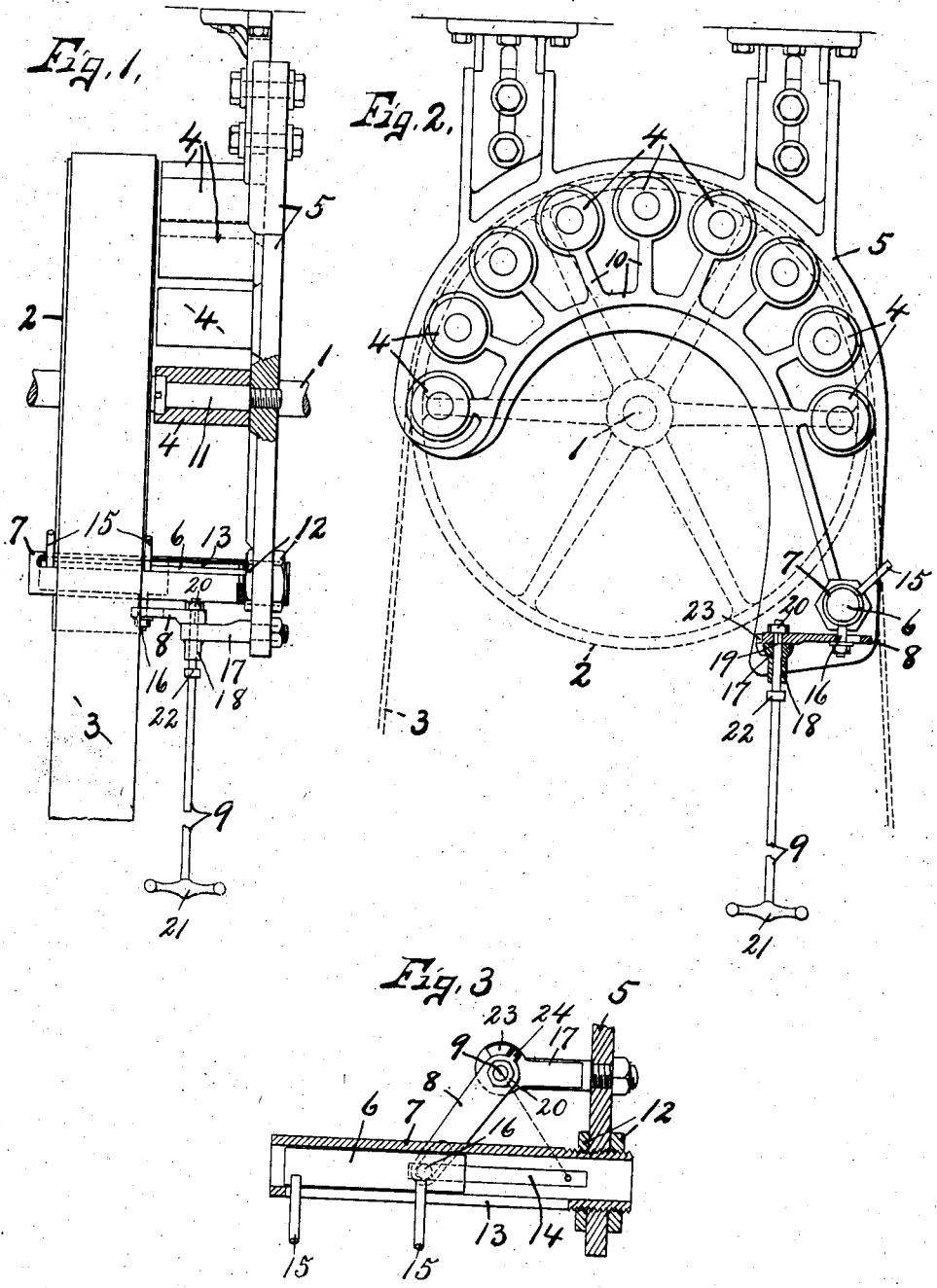

ISAAC S. NEWTON, OF SYRACUSE, NEW YORK, ASSIGNOR OF ONE-HALF TO FRANK A. CARLTON AND ONE-HALF TO HUGH McVEY, OF SYRACUSE, NEW YORK.

BELT-SHIFTER.

No. 834,532.          Specification of Letters Patent.          Patented Oct. 30, 1906.

Application filed February 6, 1906. Serial No. 299,685.

*To all whom it may concern:*

Be it known that I, ISAAC S. NEWTON, of Syracuse, in the county of Onondaga, in the State of New York, have invented new and useful Improvements in Belt-Shifters, of which the following, taken in connection with the accompanying drawings, is a full, clear, and exact description.

This invention relates to certain improvements in belt-shifters, and refers more particularly to the class set forth in my Patent No. 799,663, dated September 19, 1905, in which a belt is shifted from a revolving pulley onto a stationary support carrying a series of rollers concentric with the axis of the pulley, so as to hold the belt at rest when not in use.

My present invention is an improvement upon the belt-shifting bolt and its actuating means and guides, the object of which is to control the operation and locking of the sliding bolt by means of a single handpiece, which in this instance consists of a vertical rock-shaft provided with a handpiece and a crank-arm in operative connection with the sliding bolt to move the latter endwise through a distance substantially equal to the width of the belt.

As stated in my patent above referred to, one of the essential objects of my present invention is to bring all of the mechanism, including a fixed hanger, as closely as possible within the shifting-space of the belt, so as to allow the pulleys to be arranged on the shaft as close together as may be practicable and still leave ample clearance for the operation of the shifting mechanism without interference with any of the belts.

In my present invention I have sought to locate the rock-shaft which operates the sliding bolt directly under the rollers on the fixed hanger and between the opposite traveling sides of the belt when shifted to the rollers, because then the belt is at rest and the operator may with perfect safety engage and operate the rock-shaft to shift the belt from the rollers onto the pulley, it being apparent that when the belt is on the rollers it is at rest, and by the time it acquires motion from the pulley the operating rock-shaft is more readily accessible and out of the way of the moving belt.

It is also obvious that when it is desired to shift the belt from the pulley onto the rollers of the fixed hanger the handpiece of the roller is readily accessible, and by the time the belt has been shifted onto the rollers sufficient to travel in the plane of the rock-shaft it has practically ceased moving.

A further object of my invention is to provide a simple means for automatically locking the shifting bolt in either of its extreme positions, whereby the belt is positively held upon the pulley or upon the rollers, as the case may be.

In the drawings, Figure 1 is a front elevation of my improved belt-shifter, showing the roller-hanger, belt, and pulley. Fig. 2 is an end view of the hanger and my improved belt-shifter mounted thereon, part of the shifting mechanism being shown in section. Fig. 3 is a sectional view through the sliding-bolt guide and adjacent portion of the hanger, showing the means for shifting the sliding bolt.

In demonstrating the practicability of my invention I have shown a shaft 1 as provided with a pulley 2, receiving a belt 3, which is adapted to be shifted upon the rollers, as 4, of a vertically-adjustable hanger 5.

The means for shifting the belt preferably consists of a sliding bolt 6, movable in a tubular guide 7 and actuated back and forth by means of a crank-arm 8 and a vertical rock-shaft 9, to which the crank-arm 8 is secured.

The hanger 5 preferably consists of a malleable iron plate, the greater portion of which is concentric with and located above the axis of the shaft 1 and has one side extended downwardly some distance below the adjacent side of the pulley for receiving and supporting the tubular guide 7 between the face of the pulley and belt, as best seen in Fig. 2. This hanger 5 is made as light as may be consistent with the strength required and is in this instance reinforced by ribs 10 to resist compression strains. The hanger 5 is provided with a series of studs or bearings 11, upon which the rollers 4 are journaled, said studs consisting in this instance of shoulder-screws which are screwed into threaded apertures in the plate 5 and are provided with heads countersunk into the inner ends of the rollers 4 and serve to retain the rollers in operative position upon their respective studs.

The rollers 4 are of substantially the same length as the width of the belt 3, and have their ends adjacent to the pulley in close proximity thereto, so as to allow the belt to be easily shifted back and forth from the pulley to the rollers, and vice versa, without liability of being caught in between the end of the pulley and adjacent ends of the rollers.

The studs 11 and rollers which are mounted thereon, are arranged concentrically around the axis of the shaft 1 through substantially one hundred and eighty degrees, depending upon the inclination of the sides of the belt, and are preferably arranged as close together as possible, so as to hold the lapping portion of the belt substantially parallel with the face of the pulley.

The guide 7 for the sliding bolt 6 preferably consists of a tube threaded at one end and screwed into a threaded aperture in the lower end of one side of the plate 5, the threaded portion of the tube being engaged by suitable lock-nuts 12 to firmly hold it in operative position. This tubular guide 7 projects across the face of the pulley 2 between it and one side of the belt a distance substantially equal to the combined width of the pulley and length of the rollers 4, or, in other words, substantially twice the width of the belt, and is provided with lengthwise slots 13 and 14.

The bolt 6 is provided with a pair of belt-engaging arms 15, which project through the slot 13 and engage opposite edges of the belt, and is also provided with a stud or arm 16, projecting downwardly through the slot 14.

The length of the slot 13 is substantially equal to twice the width of the belt, or coextensive with the width of the pulley and length of the rollers 4; but the slot 14 is comparatively short, or in this instance equal to substantially half the length of the slot 13, to permit the bolt 6 to slide endwise a sufficient distance to shift the belt from the pulley 2 onto the rollers 4, and vice versa.

The rock-shaft 9 is journaled in one end of a fixed supporting-stud 17, having its other end threaded and screwed into a threaded aperture in the plate 5, just back of the tubular guide 7, as best seen in Fig. 3, the upper end of the rock-shaft 9 being angular in cross-section and fitting snugly within a similarly-formed aperture in the end of the crank-arm 8, so as to allow the shaft and crank-arm to rotate together.

The remaining portion of the rod, and especially that journaled in the bearing 18 of the support 17, is round and forms a shoulder 19 at the base of the angular portion upon which the adjacent end of the crank-arm rests and is held in place by a suitable nut 20 on the extreme upper end of the rock-shaft 9 to clamp the arm 8 against the shoulder 19.
This rock-shaft 9 extends downwardly a sufficient distance to bring its handpiece, as 21, within easy reaching distance of the operator standing upon the floor and is movable vertically a limited distance, determined by a shoulder 22 thereon, which is adapted to engage the under side of the bearing 18.

The supporting-arm 17 for the rock-shaft 9 and its crank-arm 8 is provided with a raised projection 23, and the adjacent end of the crank-arm 8 is formed with a rearward projection 24, in the path of and adapted to engage the opposite faces of the shoulder 23 when the crank-arm is rocked to either of its extreme positions for shifting and holding the belt onto the pulley 2 or rollers 4.

I have described that the crank-arm 8 is rigidly secured to the rock-shaft 9, and the shoulder 22 is located a sufficient distance below the lower end of the bearing 18 to allow said rock-shaft to be elevated sufficiently to bring the fin or shoulder 24 in a plane above the shoulder 23, whereupon the rock-shaft and its crank-arm 8 may be rotated in the bearing 18 to move the sliding bolt 6 endwise a sufficient distance to shift the belt to and from the pulley and rollers, and when moved to either extremes the upward pressure on the rock-shaft is relieved, allowing said shaft and its crank-arm to descend by gravity, thereby interlocking the shoulder 24 with one side or the other of the shoulder 23 and holding the sliding bolt 6 and belt in their adjusted positions.

What I claim is—

In combination with a pulley and belt, a fixed hanger having a series of axially-projecting rollers concentric with the axis of the pulley for receiving the belt, a tubular guide having one end secured to the hanger and its other end projecting between the belt and pulley, a sliding bolt movable in said guide and provided with belt-engaging fingers, a crank-arm operatively connected to the bolt to shift the same endwise from one extreme to the other, a rock-shaft and bearing therefor, said rock-shaft being movable vertically and secured to the crank-arm, there being a shoulder on the bearing for the rock-shaft and a shoulder on the crank-arm adapted to engage the opposite sides of the first-named shoulder as the crank-arm is rocked to either of its extreme positions to lock said crank-arm and bolt in their adjusted positions.

In witness whereof I have hereunto set my hand this 26th day of January, 1906.

ISAAC S. NEWTON.

Witnesses:
H. E. CHASE,
M. M. NOTT.